June 7, 1960  E. L. GUNN  2,939,960
METHOD OF QUALITY CONTROL OF CATALYSTS BY
RADIATION SCATTER MEASUREMENT
Filed Nov. 21, 1955  2 Sheets-Sheet 1
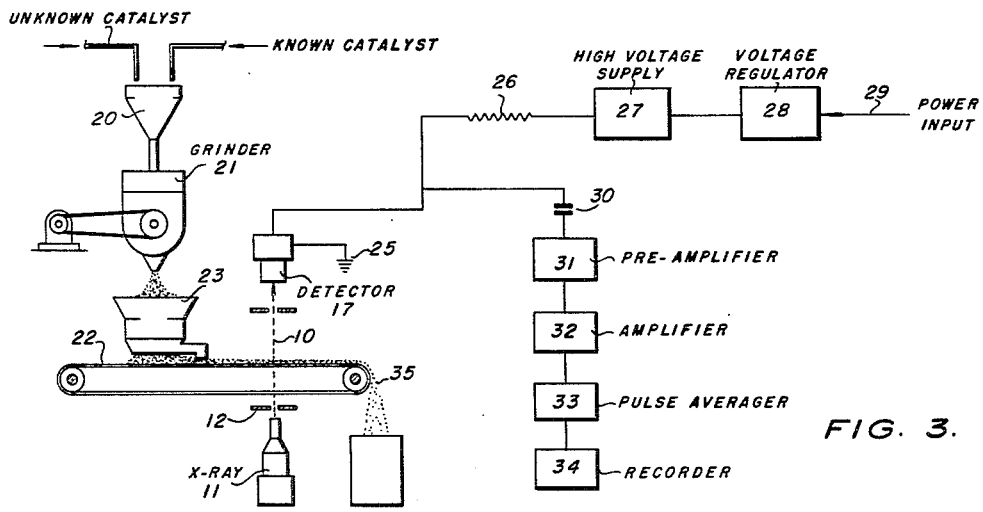
FIG. 3.
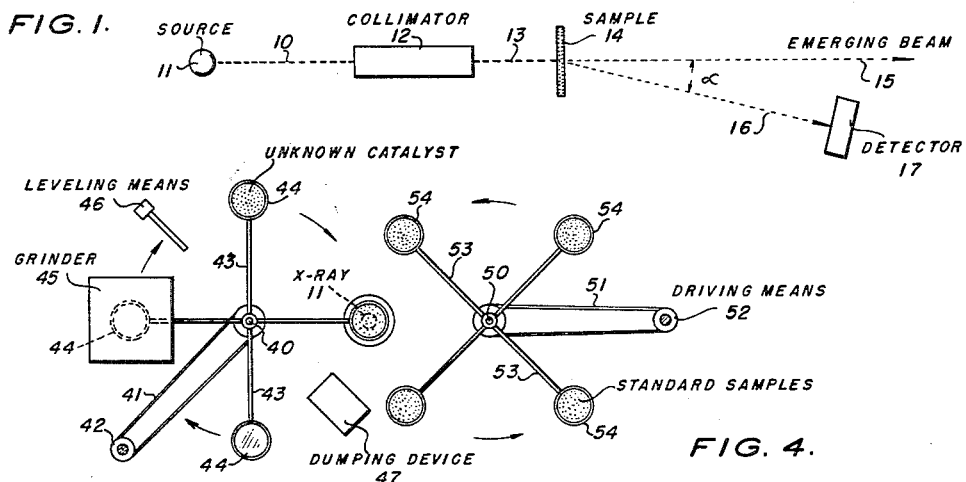
FIG. 1.
FIG. 4.
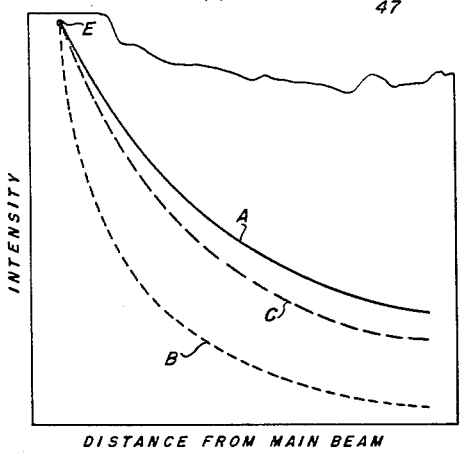
FIG. 2.
INVENTOR.
Ewing L. Gunn,
BY
ATTORNEY.

United States Patent Office 2,939,960
Patented June 7, 1960

2,939,960

METHOD OF QUALITY CONTROL OF CATALYSTS BY RADIATION SCATTER MEASUREMENT

Ewing L. Gunn, Baytown, Tex., assignor, by mesne assignments, to Esso Research and Engineering Company, Elizabeth, N.J., a corporation of Delaware Filed Nov. 21, 1955, Ser. No. 548,153

7 Claims. (Cl. 250—83.6)

This invention is directed to a method for determining the quality of catalysts by measuring the intensities of a radiation beam scattered by passage through the catalyst. More particularly, it is directed to a method for determining the quality of catalysts by measuring the small angle scatter intensities adjacent the central emergent radiation beam of an incident radiation beam scattered by passage through the catalyst.

Briefly, the invention comprises a method for controlling the quality of catalysts comprising the steps of recording and plotting the small angle radiation intensity versus the degree of scanning arc of a first reference catalyst body having a selected catalyst activity thereby obtaining a first curve, recording and plotting the small angle radiation intensity versus the degree of scanning arc of a second catalyst body of unknown activity thereby obtaining a second curve, and then replacing, when necessary, a sufficient amount of said second catalyst body by a third fresh catalyst body to vary the area under said second curve to a selected percent of the area under said first curve in order to maintain the quality of said second catalyst body at a desired level of activity.

Among the several factors of composition and physical make-up such as acidic property, water content, contaminant poisoning, state of regeneration, agglomerate particle size, etc. that influence the activity and selectivity of fluid cracking catalysts, the fine or submicroscopic structure is of importance. For example, the surface area of a catalytic substance is a property which is dependent upon the extent of particle dispersion or amorphous structure of the catalyst material. Hence, a technique by which the extent of particle dispersion is measured serves as an indication of the performance to be expected of a catalyst, used, for example, in cracking operations, hydrogen reforming processes, catalytic hydro-desulfurization, etc. Such catalysts characteristically are amorphous in structure and do not yield well-defined powder diffraction diagrams upon radiation examination. However, these catalysts do yield small angle radiation scatter patterns which provide indications of crystallite dispersion or amorphousness.

Investigations of structural change in catalyst material have shown that changes in structure which can be detected readily by radiation diffraction are accompanied, or even preceded, by practically total catalytic degradation. Consequently, in following change in catalyst structure by conventional radiation diffraction methods the activity of the catalyst decreases to a point where the catalyst is practically worthless before a significant change in structure is evident. However, small angle radiation scatter technique is capable of indicating the extent of crystallite dispersion and the extent of this dispersion is an indication of catalytic performance.

Small angle radiation scattering is attributable to large scale electron discontinuities or areas of unequal electron density in a substance. Materials having ordered crystallite arrangement or a continuous periodic structure of some type exhibit very little if any small angle scattering property. On the other hand, those substances composed of highly disordered or randomized particle structure with many submicroscopic interstices between the particles exhibit significant small angle scattering. Thus, the amount of radiation scattering increases with increased particle fineness of the substance. The term small angle means that the scattered beam lies very close, within about 4°, of the emerging undeflected, unscattered, central radiation beam.

The scattering effect for controlling catalyst quality may be utilized in two ways. In the first method the scattering intensity is plotted as a function of the distance or number of degrees from the emerging beam. A smooth curve which is asymptotic to the zero scattering intensity axis is obtained. Such curves are obtained for both reference standard catalysts of selected activity and for catalysts of unknown activity. When the activities of the reference and unknown catalysts differ, the areas under the curves will differ. For example, the curve for a used catalyst drops more rapidly than the curve for a fresh catalyst. These curves are normalized so that the maximum intensities of the standard catalyst and the unknown catalyst whose activity is to be compared with the reference catalyst are the same. The method of normalizing consists of expressing the decreasing relative intensity measurements of the scattered radiation at regular intervals away from the central beam as a ratio to the first measurement. For example, the first intensity measurement may be arbitrarily assigned the value of 100 and the other observed measurements are adjusted in terms of this value. Thus the scatter patterns are all adjusted to the same basis for comparison. The tables, to be described later, clearly show the normalizing function wherein the observed and adjusted or normalized values are tabulated.

The second method for measuring catalyst quality employs similar curves. However, instead of normalizing the curves, the intensity of the scattered beam at a selected distance, for example, 1° from the emerging beam is used. By employing a carefully regulated radiation source, the intensity at the maximum point for both the standard and unknown catalyst is essentially the same provided the intensity of the radiation beam falling upon the catalyst remains the same.

To offset difficulties involved in measuring radiation scatter from the non-linear curves plotted, a rapid method of deriving the scatter index may be employed. This comprises using the sum of the adjusted or normalized intensity values of the first method or the sum of the direct intensity values of the second method for the intervals of measurement taken. This sum provides a scatter value or factor for the catalyst and may be employed to control catalyst activity since these indices are proportional to the areas under the plotted curves. A large scatter factor indicates the extensive crystallite dispersion of a good catalyst and a small scatter factor indicates a growth to larger crystallites which constitutes a poor catalyst.

Referring to the drawings,

Fig. 1 is a schematic view illustrating apparatus employable in the method of operation.

Fig. 2 is a graph illustrating the plots of intensity versus degrees of scanning arc from the central radiation beam.

Fig. 3 is a schematic view illustrating one type of apparatus that may be employed with the invention including the electrical circuit block diagram.

Fig. 4 is a schematic view illustrating another type apparatus that may be used with the invention.

Figure 5:
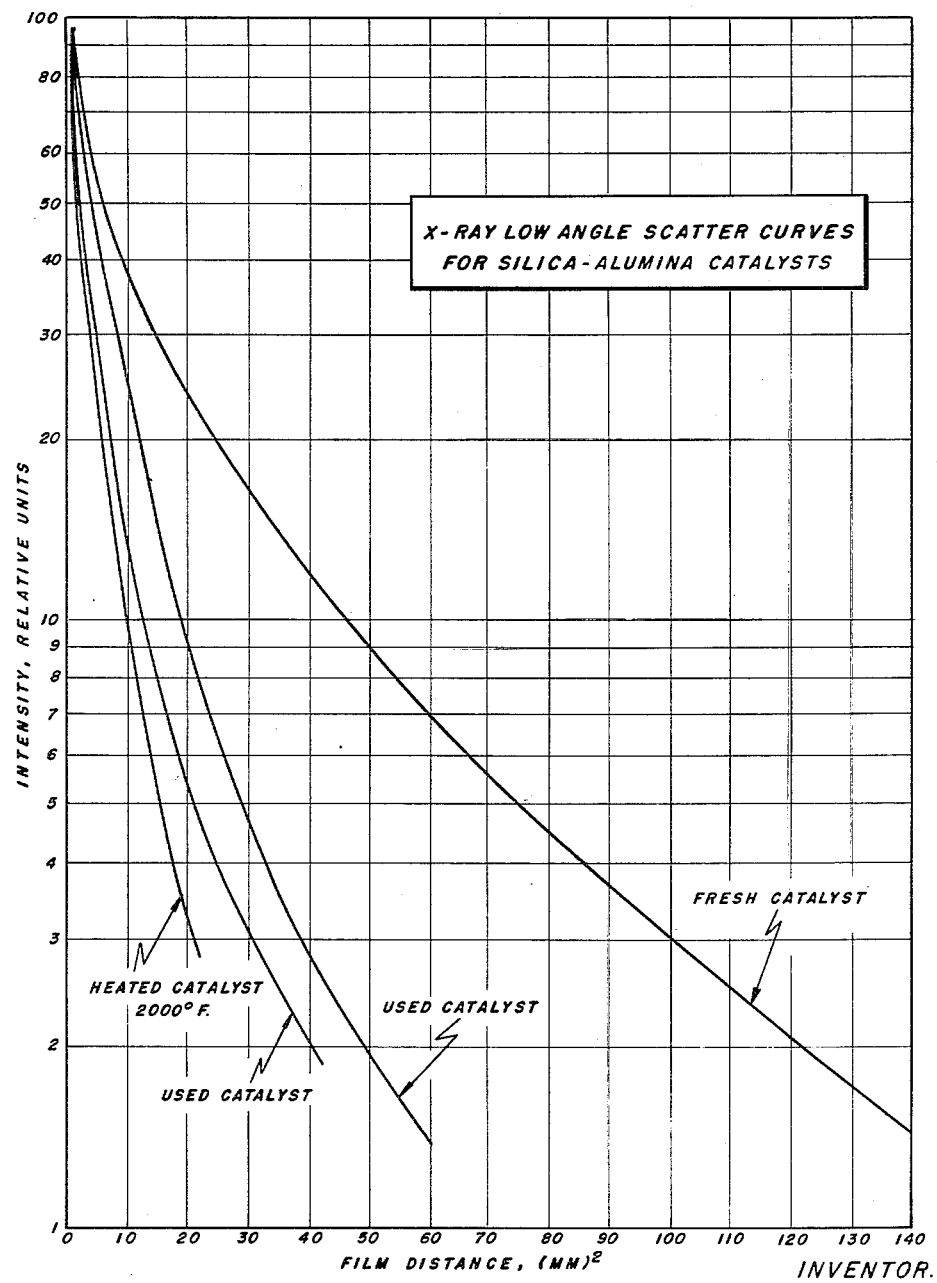
Fig. 5 is a graph based upon experimental data illustrating various X-ray small angle scatter curves for silica-alumina catalyst.

Referring to the drawings in greater detail wherein identical numerals designate identical parts, as seen in Fig. 1, a radiation beam 10 emerges from the radiation source 11 and passes into the collimator 12 which causes the beam to take the form of a very thin pencil of parallel non-diverging rays 13. The rays 13 pass into the sample 14. Sample 14 permits most of the beam to pass through undeflected and unscattered as indicated by the emergent beam 15. Some of the radiation beam, as indicated at 16 is scattered through the angle α and into the detector 17. The detector may be set at any selected angle from the emerging beam to determine the intensity of the scattered beam at that particular angle or the detector may gradually be moved along a scanning arc and the intensity at a series of different angles measured. In the former method the intensity of the incident radiation beam must be kept constant. This selected angle type operation does not result in as accurate correlation of intensity versus catalyst activity as does the scanning type operation, hence the latter is preferred. It is also preferable that the detector 17 be a Geiger counter, however, any desirable detecting means may be employed such as a scintillometer or proportional counter or a photographic detector.

Fig. 2 illustrates the curves obtained in measuring the intensity of the scattered rays. Curve A represents a reference catalyst of selected activity. Curve B represents a catalyst of unknown activity. Curve C illustrates the catalyst of unknown activity after the addition of fresh catalyst. The areas under the curves provide an indication of the catalytic activity. The catalyst of selected activity is first tested and the plotted curve A is obtained. Then the catalyst of unknown activity is tested and the curve of plot B is obtained. These curves are either normalized or a constant radiation beam source is employed when taking the measurements as noted supra. In either instance, the patterns are adjusted to the same basis of comparison as indicated at E, the point common to all the curves. When the area under the unknown catalyst curve B differs from the area under curve A of a catalyst of selected activity by any selected amount, an amount of the catalyst of unknown activity is replaced by a sufficient amount of fresh catalyst until the area under the curve B is increased or decreased to any desired percentage of the area under curve A, such as indicated by the area under curve C.

The difference between small angle scatter patterns on fresh and plant-used catalyst is readily apparent. The fresh catalyst produces a broad diffuse scatter pattern which decreases gradually in intensity away from the emergent radiation beam, whereas used catalyst produces a much more concentrated pattern in which the intensity rapidly decreases away from the beam. To illustrate this point, the scatter patterns of four catalysts are plotted in Fig. 5. Two curves for fresh catalyst before and after being heated at 2000° F. illustrate extremes in X-ray scattering. The two used catalyst curves are intermediate in scattering and the difference in X-ray scattering between them is relatively small in comparison with the aforementioned extremes. The sloped decrease of the curves can be associated with decrease in catalyst quality; that is, the rate of the decrease in scatter intensity is a function of catalytic behavior. For a catalyst having homogeneous particles or interstices, these plots should be essentially linear, and for a substance of such ideal structure a correlation of activity with scattering can be deduced. Since a catalyst is seldom or never composed of particles all of the same size, the distribution actually found produces X-ray scatter curves with bows in them, as shown in Fig. 5, rather than straight lines.

The experiments resulting in the curves of Fig. 5 and in the data of Tables I, II and III were carried out as follows:

Approximately 1 gram of silica-alumina catalyst was ground to a 200 mesh fineness by use of a mechanical mortar and pestle for one-half hour. A portion of the ground catalyst was then pressed into the aperture of a specimen holder by means of a glass slide and held in position by a layer of Scotch tape on each side of the holder.

A low angle scatter camera attachment was used for obtaining the small or low angle scatter pattern. A specimen-camera distance of 400 mm. was employed and the specimen was irradiated with nickel-filtered copper radiation for one hour. The exposed emulsion was developed for 5 minutes at 65° F., fixed for 8 minutes, washed for 30 minutes, then dried in preparation for photometry. To insure the detection of change in exposure intensity or of decrease in emulsion response which might result from depletion of the developing and fixing solutions reference catalysts of varying but experimentally known scattering properties were examined along with unknown samples. The strip chart photometer recording of the developed emulsion was made with a recording microphotometer. The scanning rate was 2 mm. per minute and 25.4 mm. on the chart is equivalent to a distance of 1 mm. on the emulsion film. A smooth curve was then drawn through the scatter contour on the chart paper and relative intensity measurements were taken at 1 mm. intervals on the film from the central beam edge.

As noted supra, experimental detecting was carried out photographically, however, it is preferred in operating practice that a Geiger counter or a scintillometer be employed since more efficient results can be obtained therewith. The degree of scanning arc as intended herein is the angular distance from the central beam edge whether photographic, Geiger counter or scintillometer methods are employed.

To test the influence and variation of X-ray exposure upon the scatter index or factor, a silica-alumina catalyst was exposed for varying times and the intensity measurements made. The results are summarized in Table I.

TABLE I

Influence of exposure time upon X-ray scattering intensity of a catalyst: exposure time, minutes

| Film dis-tance mm. | 40 | | 60 | | 72 | |
|---|---|---|---|---|---|---|
| | Intensity observed | Intensity adjusted | Intensity observed | Intensity adjusted | Intensity observed | Intensity adjusted |
| 1 | 0.90 | 100 | 1.40 | 100 | 1.65 | 100 |
| 2 | 0.455 | 51 | 0.74 | 53 | 0.86 | 52 |
| 3 | 0.238 | 27 | 0.38 | 27 | 0.44 | 27 |
| 4 | 0.123 | 14 | 0.19 | 14 | 0.215 | 13 |
| 5 | 0.060 | 7 | 0.08 | 6 | 0.11 | 7 |
| 6 | 0.033 | 4 | 0.038 | 3 | 0.056 | 3 |
| 7 | 0.016 | 2 | 0.019 | 1 | 0.028 | 2 |
| 8 | | | 0.010 | 1 | 0.015 | 1 |
| | | ¹ 205 | | ¹ 205 | | ¹ 205 |

¹ Scatter factor.

As seen from the results of Table I, although observed intensity level increased with exposure time, the adjusted results show no significant differences in the scatter indices. For example, at a film distance of 6 mm. the observed intensity was .033, .038 and .056 for 40, 60, and 72 minutes, respectively, and the adjusted intensity was 4, 3, and 3 for 40, 60, and 72 minutes, respectively. The scatter index or factor remained constant at 205.

Variance of the filament voltage from 20 to 40 kilovolts also produced no significant effect on the scatter index, as shown in Table II.

TABLE II

| | | | |
|---|---|---|---|
| Filament voltage kilovolts | 20 | 30 | 40 |
| Filament current milliamperes | 18 | 18 | 18 |
| Scatter factor | 212 | 220 | 215 |

Tests on tight and loosely packed specimen, although only qualitative, likewise indicated no significant effect on the scatter index. Also no significant difference in scattering between micronizer and mortar ground portions of a catalyst could be detected.

Fresh catalyst produces broad diffuse low angle scatter and strongly heated catalyst a narrow concentrated scatter area. Blends containing varying proportions of fresh unheated silica-alumina catalyst and the same catalyst heated for one hour at 2000° F. were analyzed and their scatter properties compared. The results are given in Table III.

Shaft 40 has connected thereto a plurality of arms 43 to which are connected sample holders 44. The holders 44 have one position wherein a grinder 45 deposits the catalyst of unknown activity, whose activity it is desired to compare with a standard catalyst, onto the holder 44. A leveling device 46 is positioned in the circuitous path of the holders 44 whereby the sample is leveled. The X-ray source 11 is positioned opposite grinder 45. A dumping means 47 is provided to dump the holder 44 to remove the sample therefrom and may suitably be a

TABLE III

*X-ray low angle scattering properties of blends containing catalyst unheated and heated at 2000° F.*

| Film distance mm. | Weight percent of heated catalyst to unheated catalyst | | | | | | | | | | | | | |
|---|---|---|---|---|---|---|---|---|---|---|---|---|---|---|
| | 0 | | 5 | | 10 | | 20 | | 30 | | 40 | | 100 | |
| | Intensity observed | Intensity adjusted | Intensity observed | Intensity adjusted | Intensity observed | Intensity adjusted | Intensity observed | Intensity adjusted | Intensity observed | Intensity adjusted | Intensity observed | Intensity adjusted | Intensity observed | Intensity adjusted |
| 1 | 0.42 | 100 | 0.76 | 100 | 0.71 | 100 | 0.66 | 100 | 0.68 | 100 | 0.60 | 100 | 0.185 | 100 |
| 2 | 0.242 | 58 | 0.29 | 38 | 0.276 | 37 | 0.246 | 37 | 0.24 | 35 | 0.21 | 35 | 0.049 | 27 |
| 3 | 0.16 | 38 | 0.169 | 22 | 0.155 | 22 | 0.135 | 20 | 0.125 | 18 | 0.108 | 18 | 0.022 | 12 |
| 4 | 0.117 | 28 | 0.102 | 13 | 0.103 | 14 | 0.087 | 13 | 0.074 | 11 | 0.065 | 11 | 0.010 | 5 |
| 5 | 0.085 | 20 | 0.070 | 9 | 0.068 | 10 | 0.057 | 9 | 0.046 | 7 | 0.037 | 6 | | |
| 6 | 0.057 | 14 | 0.047 | 6 | 0.042 | 6 | 0.038 | 6 | 0.027 | 4 | 0.022 | 4 | | |
| 7 | 0.038 | 9 | 0.028 | 4 | 0.026 | 4 | 0.027 | 4 | 0.020 | 3 | 0.012 | 2 | | |
| 8 | 0.025 | 6 | 0.018 | 2 | 0.015 | 2 | 0.020 | 3 | | | | | | |
| 9 | 0.015 | 4 | 0.012 | 2 | 0.010 | 1 | 0.015 | 2 | | | | | | |
| 10 | | | | | | | 0.012 | 2 | | | | | | |
| | ¹ 277 | | ¹ 196 | | ¹ 196 | | ¹ 196 | | ¹ 176 | | ¹ 176 | | ¹ 144 | |

¹ Scatter factor.

It is readily seen from the data in Table V that even a small weight ratio of the strongly heated catalyst increases the scattering intensity somewhat and thus lowers the total adjusted scatter index. For example, a 5% by weight of heated catalyst blended with the unheated catalyst decreases the observed scatter factor from 277 to 196. At 1 mm. film distance the observed intensity measurements for the blends are all greater than for either the unheated or heated component. Although it is unlikely that a plant-used catalyst will contain the extremes in fine structure which these blends contain, the measurements illustrated in Table V indicate the manner in which a broad range in particle size may influence scattering and in turn the correlations which may be deduced from scatter measurements.

Two types of apparatus for handling and obtaining measurements of the samples are shown in Figs. 3 and 4. One type as illustrated in Fig. 3 comprises a hopper 20 which feeds alternatively, as desired, a standard catalyst and a catalyst of unknown activity as shown into a grinder 21 which in turn feeds the ground catalyst onto an endless conveyor belt 22. This conveyor belt is transparent to X-rays and may suitably be a polyester belt. Adjacent the grinder outlet is a second hopper 23 which spreads the catalyst on the belt. The catalyst spills from the belt 22 as at 35. The radiation source 11 is shown positioned below the belt. The beam 10 radiating from source 11 passes through collimator 12 and through the catalyst material moving on belt 22. The detector 17, which in this instance is a Geiger counter, is positioned above the belt and is mounted for arcuate movement (not shown) for scanning the small angle radiation. The electrical circuit and recording mechanism is diagrammatically illustrated in Fig. 3 and includes a ground 25, a resistance 26 connected to a high voltage supply 27 and voltage regulator 28 and a power line input 29. Between the resistance 26 and the detector are connected in series a condenser 30, a pre-amplifier 31, an amplifier 32, a pulse averager or integrator 33 and a strip chart recorder 34.

Fig. 4 illustrates another type of measurement apparatus and comprises a rotatable shaft 40 driven by means of a belt 41 connected to any suitable rotating means 42. vacuum line, a vibrator, a hammer or a jet of air as desired. The direction of rotation of the arms 43 and holders 44, as shown, is in a clockwise direction. Positioned adjacent to the testing apparatus described supra is a similar apparatus and constitutes, as shown, a shaft 50 rotated by means of belt 51 and rotating means 52. A plurality of arms 53 extend from shaft 50 the ends of which are provided with standard sample holders 54. The two apparatuses are arranged to cause radiation alternatively to pass through the standard sample and the sample to be tested. Although not shown, the detector and electric circuit to be used in conjunction with the apparatus of Fig. 4 may be similar to that shown and described diagrammatically in Fig. 3. No leveling device or dumping means is needed for the standard samples as they may be prepared in the laboratory.

As noted supra, alternative to normalizing the curves, the stability or constancy of intensity of the source of radiation may be controlled. This control of the radiation may be conducted by (1) a small scintillating crystal placed in the emerging beam and intensity of scintillation measured by a photomultiplier tube and associated circuit. The output of this circuit may be used to control the source so that the intensity of the emerging beam remains at a constant value, or (2) a suitable absorbing means such as a thin aluminum block may be placed in the emerging beam to reduce its intensity and the detector used for measuring the scattered radiation may be employed for measuring the intensity of the emerging beam. Suitable control means included in the detection circuit may be used to control the source intensity as above, or (3) the intensity obtained from the standard sample is fresh catalyst may be used to control the intensity of the source so that the intensity from the standard sample is constant.

The choice from among these three means will depend upon the convenience of the particular installation. The third method is preferable, however. It is also possible to control the sensitivity of the amplifier so that the signal output of the amplifier when measuring either the emerging beam or the scattered beam from the standard sample is constant irrespective of the intensity of the source.

In operation, as in Fig. 3, the standard sample is fed through grinder 21 into hopper 23 onto moving belt 22. The low angle scatter of the X-ray emergent beam as illustrated in Fig. 1 is measured by means of detector 17. The strip chart recorder 34 records the signals registered by detector 17 propotional to the intensity of the scattered ray between preferably 0.1° and 4° of scanning arc. This results in a curve such as A in Fig. 2. The standard catalyst feed is then stopped and radiation tests are made on the catalyst of unknown activity by similarly feeding into grinder 21, leveling by hopper 23 and testing by radiation source 11. This results in curve B of Fig. 2. A sufficient amount of fresh catalyst is then added to the catalyst of unknown activity to cause the difference in area between curves A and B to approach or become any selected desired value. Fig. 4 operates similarly to Fig. 3, however, herein the catalyst of unknown activity is fed into the grinder and the standard samples are prepared in the laboratory. Alternatively arms 43 having cups 44 attached thereto and arms 53 having cups 54 attached thereto pass through the radiation beam 10 and the resulting intensity signals recorded as in Fig. 3 by the strip chart recorder 34. Similarly to the Fig. 2 embodiment a portion of the body of catalyst of unknown activity is replaced by a sufficient amount of fresh catalyst to cause the difference in areas under curves A and B of Fig. 2 to be any desired selected value.

In either the Figs. 3 or 4 embodiments, the scatter factors may be employed as the comparative values instead of using the values of the areas under the curves.

Cobalt molybdate-alumina catalysts have been measured and their catalytic quality similarly determined. However, the scatter factor values were obtained by use of a Geiger-Mueller counter instead of photographically as in the silica-alumina experiments described herein. Samples of various surface area catalyst were obtained by various degrees of heat treatment corresponding to the data of Table III wherein heated and unheated catalysts were admixed. Although Table III does not show surface area, the unheated catalyst represented by the data in the first two columns under "zero" has a larger surface area than the severely heated catalyst represented by the data in the column under "100." The data for the cobalt molybdate catalyst are shown in Table IV.

TABLE IV

| Surface area (square meters/gram) | 184 | 163 | 115 | 98 | 84 | 72 | 28 | 6 | 2.4 |
|---|---|---|---|---|---|---|---|---|---|
| Scatter factor | 292 | 269 | 196 | 174 | 162 | 136 | 111 | 78 | 42 |

As readily seen from this data a decrease in surface area results in a decreased scatter factor. As in the case of the silica-alumina catalysts a large surface area indicates good catalyst quality.

Only experimental data for silica-alumina and cobalt molybdate-alumina catalysts are disclosed herein; however, the quality of any catalyst used for the conversion in composition of petroleum components can be evaluated by the low angle scatter method of my invention.

Although X-rays were used in my experiments as the radiation any spectral property or wave length of the radiant spectrum may be used instead since the other radiant energy wave lengths exhibit a scatter effect similar to X-rays.

Having fully described the objects, operation and equipment employable with this invention, I claim as my invention:

1. A method for controlling the quality of catalysts, comprising the steps of recording and plotting small angle X-ray intensity versus degree of scanning arc of a first reference catalyst body having a selected catalyst activity thereby obtaining a first curve, recording and plotting small angle X-ray intensity versus degree of scanning arc of a second catalyst body of unknown activity thereby obtaining a second curve, the amount of scanning arc being less than about 4° of the central emergent beam in each instance, and then replacing a sufficient amount of said second catalyst body by a third fresh catalyst body to vary the area under said second curve to a selected percent of the area under said first curve in order to maintain the quality of said second catalyst body at a desired level of activity.

2. A method as recited in claim 1 wherein said detecting means is a Geiger counter.

3. A method as recited in claim 1 wherein said catalysts are silica-alumina catalysts.

4. A method for controlling the quality of catalysts employing an X-ray beam and radiation intensity detecting means comprising the steps of interposing a portion of a first reference catalyst body of selected catalyst activity in said beam, scanning the scattered emergent beam with said intensity detecting means through an arc less than about 4° of the central emergent beam thereby registering intensity signals proportional to the intensity of the radiation along the scanning path, recording and plotting said signals as a graph of intensity versus degree of scanning thereby obtaining a first curve plot, normalizing said first curve plot, removing said portion of said first catalyst body from said beam, interposing a portion of a second body of catalyst of unknown activity in said beam, repeating said steps of scanning, recording and plotting, and normalizing to obtain a normalized second curve plot and then replacing a sufficient amount of said second catalyst body with a third body of fresh catalyst to vary the area under said second curve to a selected percent of the area under said first curve in order to maintain the quality of said second catalyst body at a desired level.

5. A method for controlling the quality of catalysts employing an X-ray beam and radiation intensity detecting means, comprising the steps of interposing a portion of a first reference catalyst body of selected cracking activity in said beam, scanning the scattered emergent beam in an arc between 0.1 and 4° from the central emergent beam with said intensity detecting means thereby registering intensity signals proportional to the intensity of the radiation along the scanning arc, recording and plotting said signals as a graph of intensity versus degree of arc thereby obtaining a first curve plot, normalizing said first curve plot, removing said first portion of said first catalyst body from said beam, interposing a portion of a second catalyst body of unknown activity in said beam, repeating said steps of scanning, recording and plotting, and normalizing to obtain a normalized second curve and then replacing a sufficient amount of said second catalyst body by a third fresh catalyst body to vary the area under said second curve to a selected percent of the area under said first curve in order to maintain the quality of said second catalyst body at a desired level of activity.

6. A method for controlling the quality of catalysts employing a constant intensity X-ray beam source and radiation intensity detecting means comprising the steps of interposing a first reference catalyst body of selected cracking activity in said beam, scanning the scattered emergent beam with said intensity detecting means in an arc less than about 4° of the central emergent beam thereby registering intensity signals proportional to the intensity of the radiation along the scanning beam, recording and plotting said signals as a graph of intensity versus degree of arc thereby obtaining a first curve, removing said first catalyst body from said beam, interposing a portion of a second catalyst body of unknown activity in said beam, repeating said steps of scanning and recording and plotting to obtain a second curve and then replacing a sufficient amount of said second catalyst body with a third body of fresh catalyst to vary the area under said second curve to a selected percent of the area under said first curve in order to maintain the quality of said second catalyst body at a desired level of activity.

7. A method for controlling the quality of catalysts employing a constant intensity X-ray beam source and radiation intensity detecting means, comprising the steps of interposing a first reference catalyst body of selected cracking activity in said beam, scanning the scattered emergent beam in an arc between 0.1 and 4° of said central emergent unscattered beam with said intensity detecting means thereby registering intensity signals proportional to the intensity of the radiation along the scanning arc, recording and plotting said signals as a graph of intensity versus degree of arc thereby obtaining a first curve plot, removing said first catalyst body from said beam, interposing a portion of a second catalyst body of unknown activity in said beam, repeating said steps of scanning and recording and plotting to obtain a second curve and then replacing a sufficient amount of said second catalyst body with a third body of fresh catalyst to vary the area under said second curve to a selected percent of the area under said first curve in order to maintain the quality of said second catalyst body at a desired level of activity.

References Cited in the file of this patent
UNITED STATES PATENTS

| | | |
|---|---|---|
| 2,304,910 | Hare | Dec. 15, 1942 |
| 2,483,500 | Long | Oct. 4, 1949 |
| 2,674,363 | Graham | Apr. 6, 1954 |
| 2,805,342 | Lang | Sept. 3, 1957 |

OTHER REFERENCES

Nuclear Radiation Physics, a text book by Lapp et al., published by Prentice Hall, Inc., New York, March 1954, pages 124 to 127.